May 5, 1959

E. G. ANGER ET AL 2,885,616

MOTOR CONTROL SYSTEM

Filed May 9, 1955

INVENTORS
ERNEST G. ANGER
DORN L. PETTIT
BY
Myron J. Seibold
ATTORNEY

May 5, 1959  E. G. ANGER ET AL  2,885,616
MOTOR CONTROL SYSTEM
Filed May 9, 1955  4 Sheets-Sheet 2

INVENTORS
ERNEST G. ANGER
DORN L. PETTIT
BY
ATTORNEY

INVENTORS
ERNEST G. ANGER
DORN L. PETTIT
BY Myron J. Seibold
ATTORNEY

May 5, 1959

E. G. ANGER ET AL 2,885,616

MOTOR CONTROL SYSTEM

Filed May 9, 1955

INVENTORS
ERNEST G. ANGER
DORN L. PETTIT
BY Myron J. Seibold
ATTORNEY

United States Patent Office 2,885,616
Patented May 5, 1959

2,885,616

MOTOR CONTROL SYSTEM

Ernest G. Anger and Dorn L. Pettit, Wauwatosa, Wis., assignors to Square D Company, Detroit, Mich., a corporation of Michigan Application May 9, 1955, Serial No. 507,083

8 Claims. (Cl. 318—85)

This invention concerns a novel electrical control system providing for the regulation of speed of two or more direct current motors, which operate a continuous conveyor belt line for the processing of various types of materials, such as, for example, plasterboard or wallboard.

It is an object of this invention to provide an adjustable control system for regulating a motor driven process line which incorporates speed regulation of a main generator by control of the excitation supplied thereto to operate the line at a preset speed, and in addition provides adjustable position control between sections of the line to accomplish section speed regulation under varying load conditions concurrently with line speed regulation.

A further object of the invention is to provide a control system for maintaining proper speed relationships between different sections of a continuous process line to compensate for motor speed and process material changes occurring along the line.

A still further object of the invention is to provide a method of synchronizing a shearing motor in the process line to the motion of the material by means of an electrical signal transmitted by a metering wheel driven by said line, with provision for introduction of an adjustable correcting slip to permit small corrections in the speed relationship.

A still further object of the invention is to provide an adjustable means to effect a speed percentage change between two section drive motors to compensate for different section requirements.

It is a still further object of the invention to provide for the regulation of two or more motors to exact coordination, or when necessary an adjustable speed difference, by continuously comparing their relative angular positions, obtained by comparison self-synchronizing devices cooperating with a motor field weakening potentiometer in a novel arrangement.

It is a still further object of the invention to provide for the regulation of a motor, as above, except instead of regulating through comparison self-synchronizing devices and a field weakening potentiometer, regulation is obtained through comparison self-synchronizing devices and a magnetic amplifier circuit.

It is a still further object of the invention to provide a motor speed control system in which the field windings of the motors are connected in series circuit relationship to minimize speed differences and the effect of temperature variations between the motors.

It is a still further object of the invention to provide for the regulation of position of one direct current motor my comparison of the angular position of said motor with the angular position of another direct current motor, or the angular position of a metering wheel in the process line.

These and further objects and features of the invention will be readily apparent to those skilled in the art from the following specification and appended drawings illustrating certain preferred embodiments in which.

Figure 1:
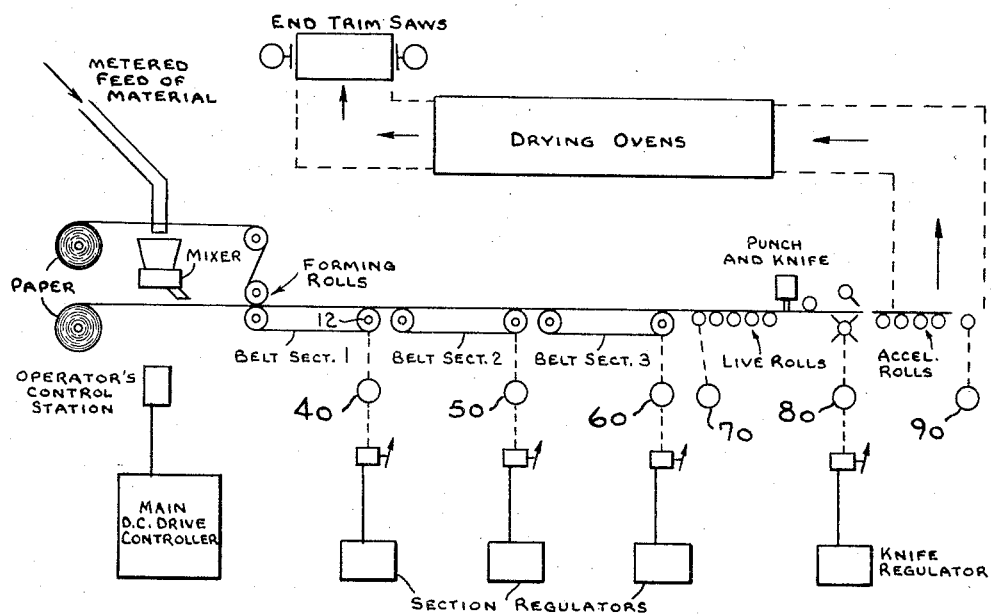
Figure 1 represents a block diagram of a plasterboard conveyor belt process line.

This invention will be described in connection with a wallboard or plasterboard process line manufacturing system merely as a representative embodiment thereof. As illustrated in Figure 1, the raw material for plasterboard manufacture is fed into a hopper and then into a mixer, where it is mixed with water to proper consistency in a mixing head and fed out onto a lower roll of paper. It then feeds through the forming rolls where the lower roll of paper is folded up and over the edges and the upper layer of paper is placed on top. As it passes through the forming rolls, the paper and mudlike material combination is reduced to the required thickness and glue is applied to the edge of the paper to secure the upper and lower parts together. It then feeds out onto the first belt section at a rate of speed which is adjustable on the machine, from 30 to 100 ft. per minute, for example. A plastic tape is fed under either side of the soft board to reduce the edge thickness so that in the construction of the home a piece of tape can be placed over the adjacent matching boards without being noticed. This plastic tape proceeds along the first two belt sections unitl the board begins to set. As the board passes along the first belt section, it is rather soft and pliable and does not set up to any degree of hardness until it is on the second belt section. On the third belt section it is somewhat harder and passes into the live roll section where it is exposed to air for drying of the underside. From here it passes into the punch and knife section.

The punch section is used to punch the holes in plasterboard only and is disengaged for the wallboard process. This punch punches the holes without interrupting the movement of the board. It is driven with elliptical gears so that the punch may enter the board and leave the board while the punch head is moving along the line at the same rate as the board.

The knife section consists of a lower knife 77 (Figures 6, 7, 8 and 9) with blades at 90° positions rotating in synchronism with the board. An upper knife 78 (Figures 6, 7, 8 and 9), consisting of a single blade, is arranged with a clutch and triggering mechanism to be brought into action by a chain and dog release (not shown), to cut the board into any desired length in multiples of 1 ft. from 4 ft. to 16 ft., for example. The board then passes on to an accelerating section and is fed out onto a reversing table, where it changes direction to feed through an oven line where curing takes place to harden and dry it. Tables at the outlet of the oven feed the boards through saws which trim and true the ends so that butt joints may be used in construction work. Packing and bundling then follows for warehousing and shipment.

Figure 2:
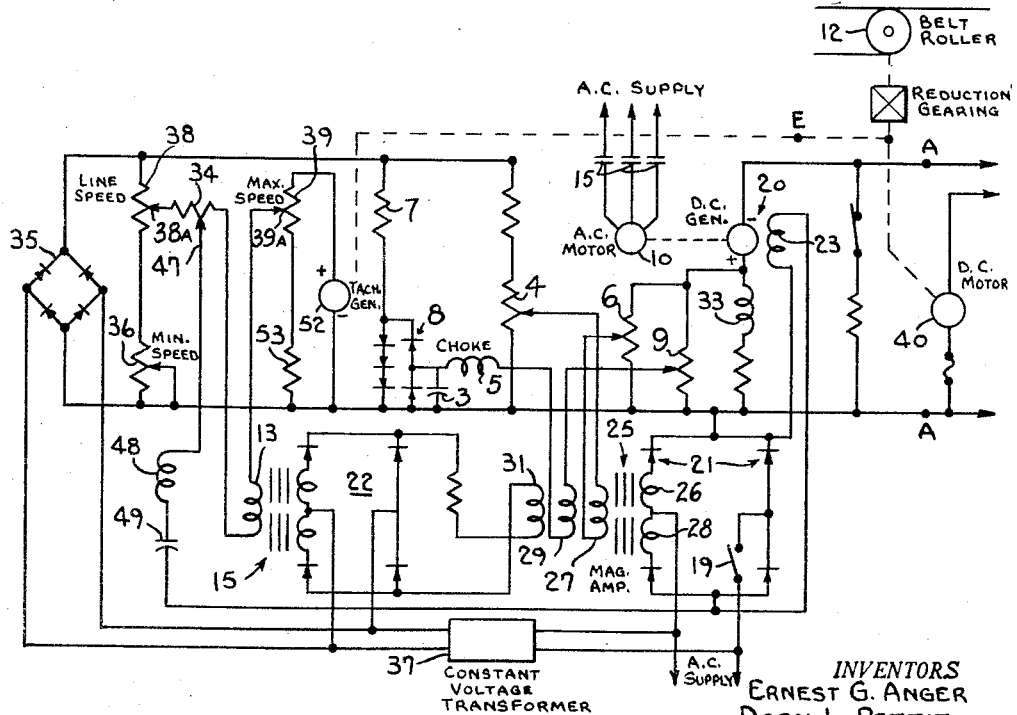
Figure 2 represents a schematic wiring diagram of the main drive regulator portion of the control system.

Referring now to Figure 2 in which is shown the main drive regulator circuit, an alternating current motor 10, connected to a source of A.C. supply, drives a direct current generator 20 upon closure of contactors 15 to provide a source of direct current supply for the motor armatures 40, 50, 60, 70, 80 and 90 through points A—A (Figures 2, 3, 4, 6, 7, 8 and 9). Note that these direct current drive motors 40, 50, 60, 70, 80 and 90 and their corresponding armatures bear the same numbers, as they are functionally identical for purposes of this description.

The main drive regulator circuit has an alternating current power supply which furnishes a relatively constant voltage through a constant voltage transformer 37 to a rectifier bridge 35. The bridge 35 supplies a relatively stable direct current voltage across the potentiometers 38 and 36 to provide a reference voltage for the main regulator circuit.

Contacts 19, controlled by relay 17 (Figure 5), connect the alternating current power supply with a dry disc rectifier stack 21, which furnishes a direct current excitation voltage to the generator field winding 23. The rectifier stack 21 forms part of a magnetic amplifier circuit to be subsequently described. The rectifiers of stack 21 are connected in a bridge-arrangement with output windings 26 and 28 of a magnetic amplifier reactor unit 25 included in two legs of the stack 21. Control of the saturation of the iron in the core of reactor unit 25 provides control of the circuit and the D.C. voltage applied to the generator field 23 in a manner well known in the art.

A second saturable reactor 15 and its corresponding rectifier stack 22 form a second magnetic amplifier circuit which is connected in cascade, as the first stage, with the magnetic amplifier circuit of reactor 25 and stack 21 as the second stage. The direct current control winding 13 of reactor 15 is connected between a pair of potentiometers 38 and 39. The potentiometer 38 is connected to potentiometer 36 across the rectified output of rectifier 35 and permits a line speed adjustment of the reference voltage to be obtained. The potentiometer 36, in series with potentiometer 38, permits an adjustment for minimum speed. The potentiometer 39 connected in series with a resistor 53 and across the output of tachometer generator 52, permits an adjustment of the maximum speed in a manner to be subsequently described. A potentiometer 34, in series circuit with the control winding 13, has a slider 47 permitting adjustment of a damping signal voltage in a manner to be subsequently described.

Figures 3, 4:
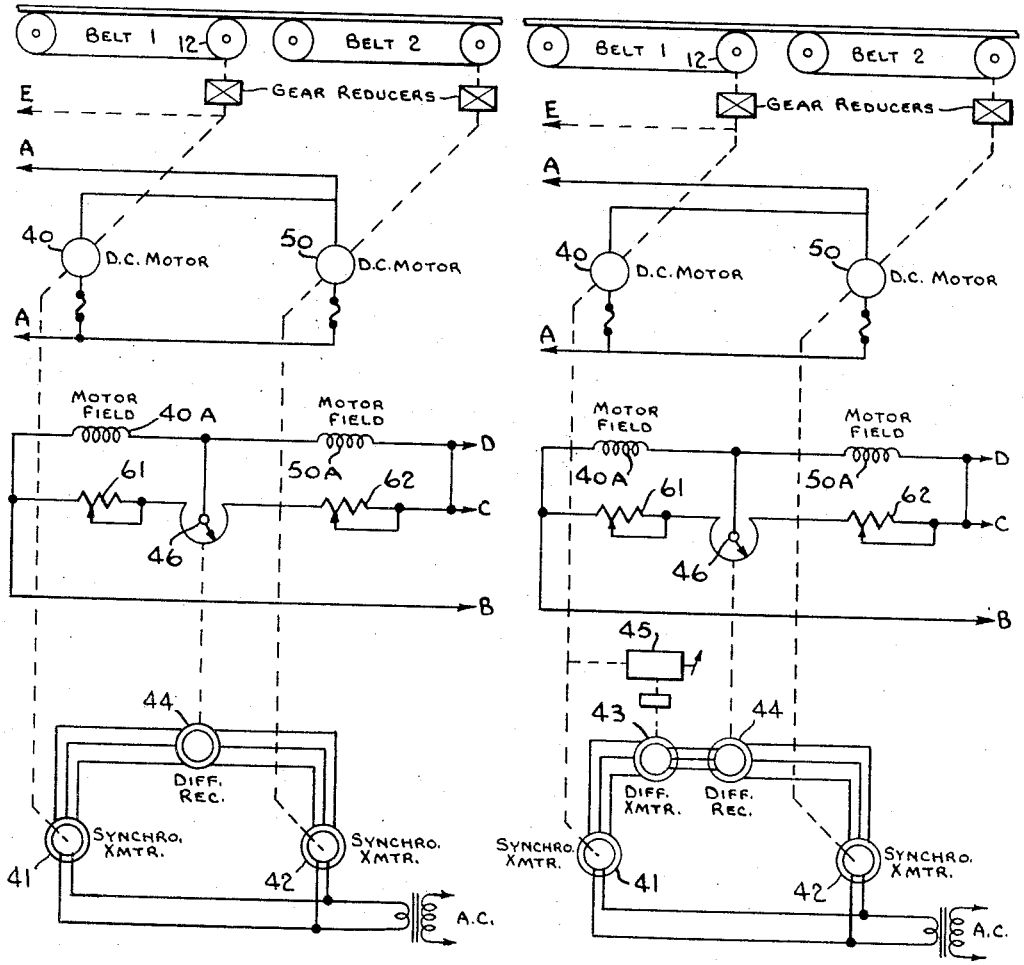
Figure 3 represents a combined block and schematic wiring diagram of the two representative belt sections of the control system.
Figure 4 represents a combined block and schematic wiring diagram of two representative belt sections of the control system, similar to Figure 3, but illustrating an added feature for effecting an adjustable speed difference between the respective sections.
Figure 5:
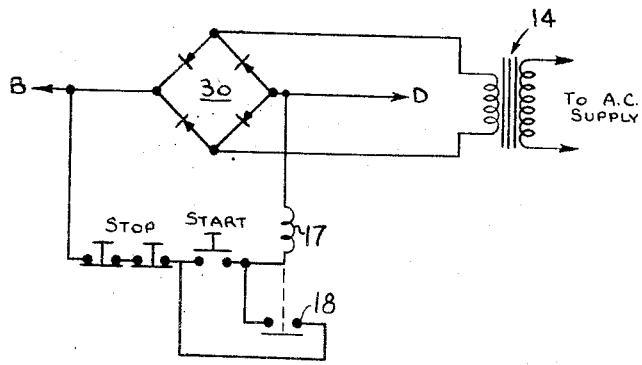
Figure 5 represents a schematic wiring diagram of the start and stop portions of the control system.

The tachometer generator 52, electrically connected across potentiometer 39 and resistor 53, is mechanically coupled to the first belt motor 40 and furnishes an electrical output in direct proportion to the speed of said motor. It is not necessary that tachometer generator 52 be mechanically coupled to the first belt motor 40 but may be connected to any of the belt motors because its response is to be indicative of the actual speed of the line. Referring now to Figure 3, in which is shown, for example, the first two belt sections of the process line, the field winding 40A of motor 40 is connected in series with the field winding 50A of motor 50 and connected at points D and B to the direct current output of rectifier 30 (Figure 5). In order to regulate one belt speed with respect to the next, all belt motor field windings 40A, 50A, and the field windings (not shown) of motors 60, 70 and 90 are placed in series with bridging resistors across each field to obtain speed control by field weakening. For example, only the field windings 40A and 50A are shown, because the other field windings are connected in the same manner. The adjustable bridging resistors 61 and 62 are connected in shunt circuit with the field windings to provide adjustable field weakening in conjunction with potentiometer 46 in a manner to be subsequently described.

The angular position of each motor armature, as well as the speed relationship of one section compared to the next, is controlled by the use of a differential control system which indicates the position and reflects the position and speed discrepancy between adjacent motors to vary the resistance in the field shunting circuits. In the following description and in the claims, reference is made to synchro transmitters and receivers. These are self-synchronizing devices commonly known as "selsyns" or "synchros" which are well known in the art. They may be connected either as transmitters (generators) to translate a mechanical indication reflecting a motor position into an electrical output, or as a receiver (motor) to translate an electrical indication into a mechanical output to change a position. A synchro transmitter 41, mechanically coupled to and driven by belt motor 40 to obtain an electrical voltage output indicative of the speed of said motor, is electrically connected to an A.C. supply source and has its electrical output connected to one side of a differential synchro receiver 44. A second synchro transmitter 42, mechanically coupled to and driven by belt motor 50, is electrically connected to the same alternating current supply source and has its electrical output connected to the other side of differential synchro receiver 44. The differential synchro receiver 44, operated in a reverse sense from the sychro transmitters 41 and 42, is connected in series circuit therewith and has for the utilization of its mechanical output a direct connection with a potentiometer 46. One arm of the potentiometer 46 is connected in the circuit of resistor 61 which shunts its associated motor field winding 40A while the other arm of the potentiometer 46 is in the shunting circuit of the succeeding section (resistor 62) of motor field winding 50A.

An alternate system is shown in Figure 4 wherein a differential synchro transmitter 43 is inserted in series circuit with the differential synchro receiver 44 and synchro transmitter 41 and is mechanically coupled to and driven by an adjustable means 45. The adjustable means 45 is an adjustable transmission device which is driven by a motor and in turn drives another device at any preselected speed difference. The adjustable transmission 45 is mechanically coupled to and driven by motor 40 and is adjusted to drive the synchro transmitter 43 at a reduced speed.

Figure 6:
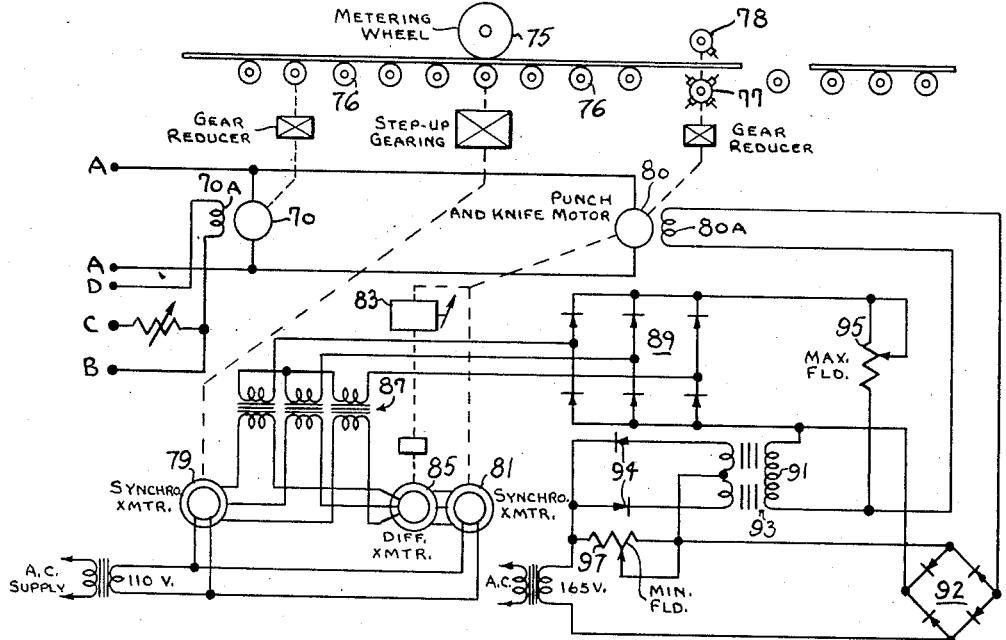
Figures 6, 7, 8 and 9 represent combined block and schematic wiring diagrams of two representative sections of the control system with alternative methods of regulation.

Referring now to Figure 6 in which is shown the live roll section, its motor 70 and the punch and knife section and its motor 80. A synchro transmitter 79 is mechanically couped to and driven by a metering wheel 75 which is provided to meter quantities of the prepared plasterboard into position for the subsequent punch and shearing operation. The synchro transmitter 79 is electrically connected across a source of alternating current supply and has its output electrically connected to comparison transformers 87. A synchro transmitter 81 is mechanically coupled to and driven by the punch and knife motor 80 and electrically connected across an alternating current supply and has its electrical output connected to a differential synchro transmitter 85. The differential synchro transmitter 85 has an adjustable transmission means 83 mechanically coupled to and driven by the knife motor 80. The adjustable transmission means 83 operates in a manner similar to the adjustable transmission means 45 to introduce a speed difference signal to the comparison circuit consisting of synchros 79, 81, 85 and transformers 87. The output of transformers 87 is connected to a magnetic amplifier circuit consisting of rectifier stack 89, saturable reactor 93 and rectifiers 94. A rectifier 92 connected across an alternating current power supply supplies a direct current excitation voltage to the field winding 80A of motor 80. An adjustable resistor 95 in the control signal circuit permits adjustment of the maximum signal current and, therefore, of the maximum current of field winding 80A, and thereby adjustment of the minimum speed of motors 80. An adjustable resistor 97 in series with the field rectifier 92 permits setting of the maximum field and, therefore, maximum speed of motor 80.

Figure 7:
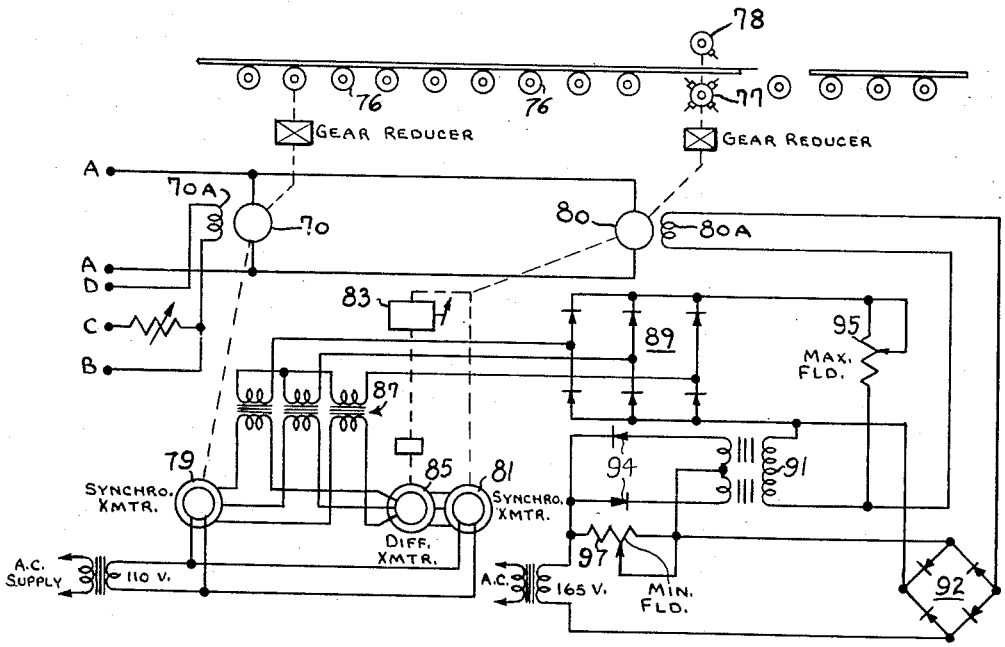

In Figure 7 is shown a system similar to the system of Figure 6 with an alternative method of regulation. In this system the synchro transmitter 79 is mechanically coupled to and driven by the live roll motor 70 instead of the metering wheel 75 of Figure 6. The remaining components are identical to and operate in the same manner as the corresponding components of Figure 6.

Figure 8:
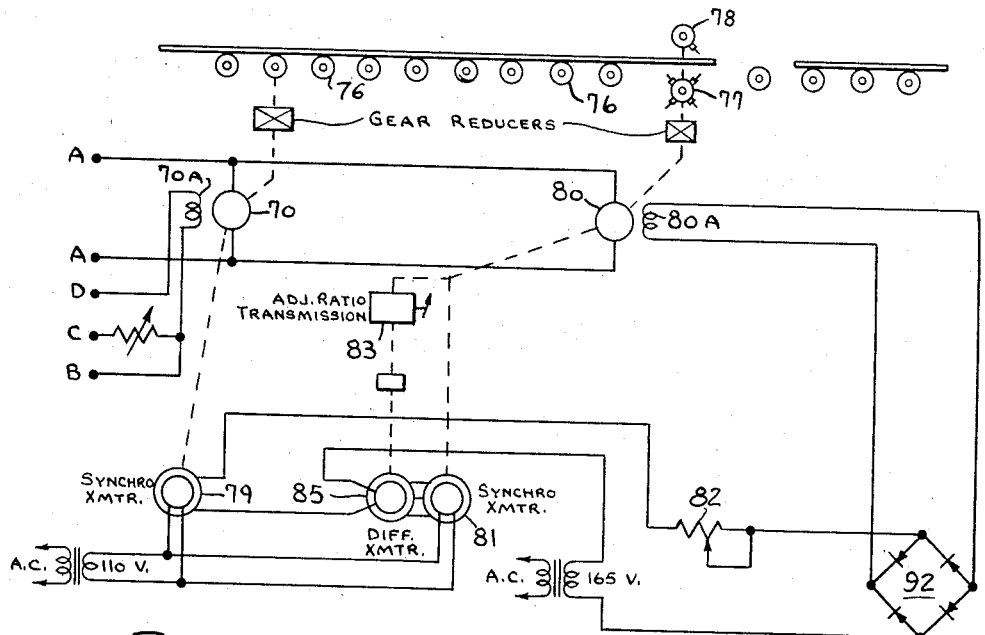
Figure 9:
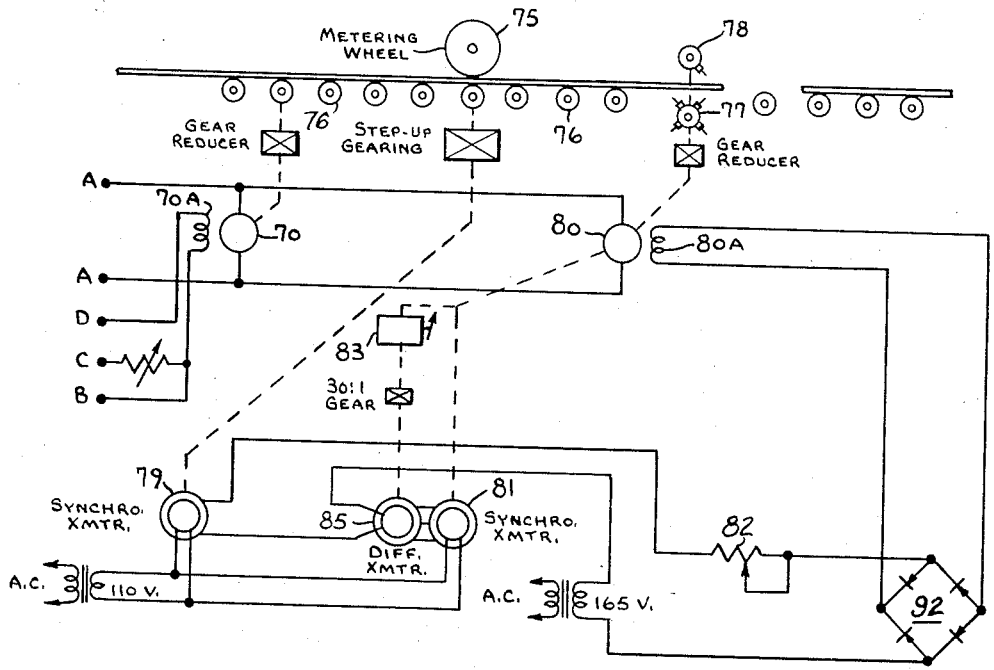

In Figure 8, comparable to Figure 7, and in Figure 9, comparable to Figure 6, the speed difference output of the synchros 79, 81 and 85 is connected directly to the rectifier bridge 92 through an adjustable rheostat 82. The remaining components are identical to and operate in the same manner as the corresponding components of Figure 6, heretofore described.

Referring now to Figure 5 in which is shown an alternating current supply transformer 14 which has its output connected to a rectifier bridge 30. The bridge 30 is connected at B and D to supply direct current power to the field windings 40A, 50A, 60A, 70A and 90A, as previously mentioned. A start and stop circuit is shown connected across the output of rectifier 30 and has a start relay 17 in series with the start and stop buttons. The relay 17 operates contacts 18, 19 and contactors 15. The latter two components are shown in their circuit relationships in Figure 2.

Operation

In operation, closure of the start button energizes the relay 17 to close contacts 18 (which complete a holding circuit around the start button), closes contactors 15 and closes contacts 19 (Figure 2). The closure of the contacts 19 energizes the main drive regulator circuit, and the closure of contactors 15 starts the operation of the motor generator set (10—20). The motor 40 is regulated to a predetermined speed by variation of the excitation voltage applied to generator field winding 23, and because the output of generator 20 is connected in parallel with all the motor armatures 40, 50, 60, 70, 80 and 90, will thereby maintain approximate speed of all the drive motors. These speeds and relative positions of the motors are further regulated to exact synchronization by regulators to be described below.

It will be observed that the series connection of fields minimizes the effect of field resistance variations due to differences in temperature between the respective motors. Some of these motors might operate near ovens or in open sunlight, whereas others are in a fairly cool portion of the building. With the motor fields in series, the warm-up of any one field affects them all and thereby minimizes the effect, thus reducing the amount of regulating correction required by the control system.

With a preset speed position of potentiometers 36, 38 and 39 selected by the operator and rectifier 35 providing a relatively stable reference voltage at slider 38A, and prior to initial movement of motor 40, a relatively large voltage is reflected across the control winding 13 of saturable reactor 15 and a resulting high current therethrough. The output of the saturable reactor 15 is controlled by the direct current drawn through its control winding 13 and therefore with a high current, the output across the rectifier stack 22 is decreased and transmitted to the control winding 31 of saturable reactor 25. The rectified output of reactor 25 is applied across the field winding 23 of generator 20. This will initiate voltage increase of generator 20 when contact 19 closes in response to energization of its coil 17, and result in acceleration of the drive motors 40, 50, 60, 70, 80 and 90. The initial acceleration of motor 40 will be transmitted back through the mechanical coupling to the tachometer generator 52 where it is reflected in a feedback voltage signal across potentiometer 39 and resistor 53. The feedback voltage signal of tachometer generator 52 will oppose the reference voltage heretofore applied at potentiometer slider 38A and across the control winding 13.

The adjustment of the maximum speed potentiometer 39 causes the feedback voltage at maximum operating speed to be slightly greater than the voltage at potentiometer 38. This small difference is sufficient to maintain the flow of regulating control current. A strong regulating action is then provided, since a small deviation of tachometer voltage can cause a considerable change in control current (through winding 13) and magnetic amplifier output to accomplish a correcting change to the generator 20. Thus, when the preset speed of motor 40 is attained, the feedback voltage at potentiometer slider 39A will match the reference voltage at potentiometer slider 38A and will reflect its match across the control winding 13. The match of voltages then maintains the speed of motor 40 and its follower motors to the preset speed position.

In the event the operator changes the preset speed to accelerate or decelerate the process line, a damping effect is provided to prevent sudden speed changes. A potentiometer 34, in series circuit with the winding 13, has a slider 47 which permits adjustment of the damping signal voltage transmitted from rectifier 21 through capacitor 49, which is of a polarity to momentarily oppose any change of voltage produced by change of potentiometer. This may be further explained as follows: As the voltage applied to the field winding 23 increases, current drawn by the damping capacitor 49 through filter choke 48 causes a voltage drop across the damping potentiometer 34 which strongly opposes the voltage applied to the control winding 13 by the speed potentiometer 38. The rate of voltage increase and therefore the response is limited until the capacitor 49 is fully charged to thereby delay or dampen the speed change until tachometer feedback at the new voltage again matches the reference voltage. The choke coil 48 produces filtering of rectifier ripple components from this voltage. The effective new excitation voltage will be fed through a dual magnetic amplifier circuit for transmittal to the generator field winding 23 to provide amplified excitation voltage to change the speeds of the belt motors 40 etc. The sensitivity of the dual magnetic amplifier circuits permits full change of output with a fraction of a volt applied at the control winding 13.

A bias control winding 27 of saturable reactor 25 is connected across potentiometers 4 and 6. The potentiometer 4 is an adjustable bias resistor which is utilized to provide a bias for the saturable reactor 25 in its control characteristic in the desaturation direction. The potentiometer 4 is adjusted so that minimum output to the field winding 23 at correct required speed may be obtained with sufficient current, of saturating polarity, drawn through the control winding 31 to insure operation through a favorable range of the pre-amplifier (15 and 22) output characteristic. The bias current is not varied by change of the speed setting potentiometer 38 and, since the magnetic amplifier output is determined by the algebraic sum of all control ampere turns, this winding 27 merely shifts the curve of output versus control.

Also included in the bias winding circuit is an adjustable IR compensating potentiometer 6. This potentiometer 6 is connected across the generator commutating field 33, so as to receive a voltage drop which is proportional to the current load drawn by the motors 40, 60, 70, 80 and 90, and is of a polarity to reduce the bias current as the load increases. It is adjusted so that the resulting shift in the amplifier output characteristic by the change in bias current causes an increase in the amplifier output to the generator field 23 so as to raise the voltage applied to the motor armatures 40, 50, 60, 70, 80 and 90 enough to compensate for their resistance drop and armature reaction effect. This compensation reduces the required regulation of the magnetic amplifier circuit.

A control winding 29 of reactor 25 is connected in series with sections of a current limit rectifier 8 and a current limit potentiometer 9. The potentiometer 9 is connected across the generator commutating field 33, similarly to potentiometer 6, and has a voltage drop proportional to the generator armature current. A biasing current drawn through resistor 7 from the reference voltage supply causes a constant voltage drop to be maintained across the left section of rectifier 8. The polarities of this voltage are such as to prevent conduction through the remaining sections to the winding 27, connected at their junction. Filter choke 5 and capacitor 3 prevent rectification of harmonic voltages present in the winding 27. When accelerating or steady load conditions increase beyond the limit set by the slider of potentiometer 9, the bias voltage is exceeded and current is conducted through the single disc section of rectifier 8 to the resistor 7. This current flows through the winding 29 in a direction to decrease the saturation of the magnetic amplifier (25—21), and is strong enough to overcome the regulating action of the control winding 31, since the resistance in the current limit circuit is low. The generator field 23 is prevented from increasing too rapidly, or weakened, if necessary, so as to limit the current flow from the generator to the motor armatures until the motors 40, 50, 60, 70, 80 and 90 accelerate. When the speed increases to the preset value, the feedback of tachometer voltage permits the regulating windings 31 and 13, as heretofore mentioned, to resume control, and the generator armature current decreases to the amount required by the running load.

If the speed setting is decreased suddenly, decelerating current flows as voltage generated by the motors 40, 50, 60, 70, 80 and 90 exceeds that of the generator 20, and the voltage across potentiometer 9 reverses. The other section of rectifier 8 then conducts current through the winding 29 in the opposite or saturating direction, as soon as the threshold conduction potential is exceeded. The bias section of rectifier 8 is then by-passed. This saturating current through winding 29 prevents weakening of the field 23 too rapidly so that the decelerating current is limited to a low value until the new preset speed is attained.

The operation of the system for differential angular position and speed control will now be described, as illustrated in Figures 3, 4, 6, 7, 8 and 9. The differential speed regulating system is provided to hold the relative angular position relationship between the three belt section motors 40, 50 and 60 and the live roll motor 70 in close synchronization for any selected line speed. The system also permits independent adjustment of the slip between successive sections to insure that proper tension is maintained at every portion of the wet plasterboard as it travels from the forming rolls to the roll table. In Figures 3 and 4, with the process line in operation, a motor speed difference between motors 40 and 50, occasioned by changing load characteristics of the plasterboard material, necessitates individual motor speed correction to maintain smooth and continuous operation of the process line. In this event the angular position of each motor armature is compared by its corresponding synchro transmitter. Because the synchro transmitters 41 and 42 are directly coupled to and driven by their corresponding motors 40 and 50, any angular displacement between the motors 40 and 50 will result in a corresponding angular displacement between the rotors of synchro transmitters 41 and 42. Also, because the differential synchro receiver 44 is connected in series with the transmitters 41 and 42, any change in their angular displacement will be communicated as a voltage to the receiver 44, with polarity according to the transmitter having the greater speed. The synchro receiver 44 will then rotate to move the potentiometer 46 a small distance to provide the corrective field weakening necessary to bring the motors 40 and 50 into synchronization. Obviously, if no angular displacement exists between the motors 40 and 50, indicating proper speed relationships, no voltage will be present at receiver 44 and it will be at rest until an unbalance is indicated and it again moves to correct the unbalance.

In some instances it may be desired to slightly increase or decrease the speed of one motor in relation to the next by introducing a set percentage of slip to accommodate, for example, difference in the belt drive pulleys and shrinkage or expansion of the plasterboard. This may be obtained (Figure 4) by the use of the adjustable transmission means 45 and a differential synchro transmitter 43 to introduce a speed correction difference. The operator, after determining that one motor is leading or lagging its adjacent motors, makes an initial manual adjustment on the adjustable transmission 45 which introduces a mechanical speed difference to the differential transmitter 43. To compare with the speed of synchro transmitter 41, the synchro transmitter 42 must then run at a speed which equals the speed of motor 40 plus the differential introduced by the speed difference synchro transmitter 43. If this condition is not maintained, the difference synchro transmitter 43 will rotate and introduce a correction signal through its differential synchro receiver 44 and thereby to the potentiometer 46, which will correct the speeds of the two motors until the difference synchro transmitter 43 comes to rest, whereupon the speed of motor 50 will equal that of motor 40 plus the speed difference fed in. Note that in Figure 3 the position difference between the synchros 41 and 42 is directly connected by the synchro receiver 44 to the potentiometer 46 to provide a synchronous position correction system, without providing for a speed difference system as shown in Figure 4. Resistors 61 and 62 on either side of the synchro driven potentiometer 46 permit adjustment to limit the field control range as well as center the normal operating position of the potentiometer 46. This adjustable setting, by providing an operating range, prevents excessive weakening of the field which it shunts to prevent any dangerous rise in motor speed.

Note that the position difference control of this system obtains the best possible results because initially the plasterboard is so soft that tension between belts 1 and 2 must be held so low as to cause a regulating problem and there is considerable change in the length of the board as it progresses through its curing cycle so that the board is always swelling or shrinking as it proceeds along the belt line. These positions of swelling or shrinking are not stable points along the line, but vary with the speed of the line and quality of the mix being used. Other conditions, such as temperature and humidity, also affect this curing cycle. Therefore, these considerations require the use of motor position difference control to obtain proper regulation of the process line. Of particular importance in observing this system is that the regulated difference in speed of the belt sections is a preset small proportion of the overall line speed, for example, the adjustable ratio transmission 45 of Figure 4 has an accuracy of a small fraction of 1% of its maximum setting and is geared to provide a 3% maximum correction at that setting. The maximum differential error therefore that the regulator can permit is less than .03%. Since the synchros are driven with sprocket gears (not shown), no further inaccuracy would be introduced because of slip.

One of the objects of the invention was to provide precise shearing or cutting of the board lengths. This is obtained by providing a metering wheel 75 (Figures 6 and 9) which meters the quantity of board coming off the live rolls 76 into position near the rotary knives 77 and 78. The knife motor armature 80 is powered from the same voltage (generator 20) as the preceding and succeeding motors, and therefore tends to run approximately in proper speed relationship with the other drive motors for all speed settings. To provide close control of the cutting or shearing operation, faster regulation of the knife section is required. This is obtained by a rapidly acting position regulating system, which holds the speed of knife motor 80 in exact synchronization with the plasterboard line speed by set adjustment of its speed through control of field 80A. A magnetic amplifier circuit in Figures 6 and 7 improves the speed of regulation by providing a field forcing effect. In Figure 6, the metering wheel 75 controls the field winding 80A through the magnetic amplifier by its coupled synchro transmitter 79 which gives a direct measurement of the movement of the board. This system is similar to the belt motor regulators heretofore described, in that position synchro transmitters 79 and 81 are employed in connection with the metering wheel 75 and the knife motor 80 respectively, with a speed difference being fed in by an adjustable transmission 83 to a synchro transmitter 85. However, a different method is employed to regulate the field winding. A voltage output from the synchro 79, reflecting the relative position of metering wheel 75, is compared with the voltage output of synchro 81, reflecting the relative position of knife motor 80, modified by the small difference voltage of the speed difference synchro 85 which reflects the speed difference required. The voltage difference in the electrical signals transmitted to the synchro combination 81—85 driven by the motor 80 and the synchro 79 driven by either the metering wheel 75 (Figure 6) or the motor 70 (Figure 7) is compared by three transformers 87 connected between synchros 79 and 85. The output of these transformers 87 is combined and rectified through rectifier stack 89 to provide a direct current signal through the control winding 91 of the magnetic amplifier system. This current is approximately proportional over the range of regulation to the instantaneous difference in angular positions of the synchros 79 and 81 plus the adjustable speed difference provided by transmitter 85. To provide the maximum possible speed of response, which requires overcoming the highly inductive field winding 80A, direct feedback of the current of field winding 80A is employed. This is accomplished by connecting the control winding 91 so as to receive a current which is the difference between the control signal output and the current of field 80A, both of which are several times that required to change the conduction of the saturable reactor 93. The magnetic amplifier circuit and its saturable reactor 93 then automatically is required to regulate its output current through the field 80A at a value slightly greater than the signal current, by the amount required by the control for that output. When the minimum and maximum field adjustment resistors 95 and 97 are properly adjusted, the rectified signal is strong enough to overcome the field current feedback. It is then able to exert considerable forcing action to accomplish a change in the field current quickly, since a small discrepancy in the difference between the signal and feedback currents is able to swing the amplifier saturation completely to either end of its range temporarily until the required change of current is accomplished. With this system, the speed of knife motor 80 can be changed rapidly with respect to the line speed by small and accurate amounts through use of the adjustment on the speed difference transmission. In this way the length of board passing through the knife between cuts can be controlled accurately.

In Figure 7 the same system is used, except that the position signal from the acceleration belt motor 70 is communicated to the synchro 79 instead of the signal from the metering wheel 75 which may be omitted. This system then regulates the motors 70 and 80 to maintain synchronization between the two sections.

In Figure 8, comparable to Figure 7, and Figure 9, comparable to Figure 6, the position difference signal is fed directly to a rectifier bridge for transmittal to the knife motor field 80A without amplification as a more economical method of modification but without field forcing action. In all other respects the components of the systems of Figures 7, 8 and 9 are identical in kind and operation to the components of the system of Figure 6 heretofore described.

In the following claims, reference is made to "position responsive means" and "differential means" which are contemplated to include mechanical equivalents for the synchro transmitters (position responsive means) and the differential synchro receivers (differential means). Obviously, where location distances are not a factor, a mechanical coupling, such as a flexible shaft, may be inserted between the motor 40 and a differential transmission device, such as differential gears, and a second flexible shaft connecting motor 50 and the same transmission device to produce a mechanical output driving the potentiometer 46 in proportion to the angular position or speed variation existing between the motors. In essence, such a mechanical system would be very practical where the belt motors 40 and 50 are located within short distances of each other. In the particular application disclosed in this invention, distances between motors 40 and 50 of several hundred feet are required which necessitates electrical coupling as a more practical method of application.

Therefore, while certain preferred embodiments of the invention have been disclosed, it is understood that the invention is not limited thereto, as many variations will be readily apparent to those skilled in the art and the invention is to be given its broadest possible interpretation within the terms of the following claims.

What is claimed is:

1. In a motor regulating system, a plurality of direct current motors driving a conveyor belt process line, a source of regulated direct current supply connected to the input of said motors, field windings for said motors, all of said field windings except one connected in series circuit with each other, said one field winding having a separate direct current supply source and circuit, a synchro transmitter mechanically coupled to the motor of said one field winding to furnish an electrical output indicative of the position of said motor, means movable by said conveyor belt process line, another synchro transmitter mechanically coupled to said means to furnish an electrical output indicative of the position of said means, and a comparison circuit connected to said separate voltage supply source and having its output connected to said one field winding to transmit a comparison voltage to said one field winding, said synchro transmitters electrically connected to said comparison circuit to transmit their respective electrical outputs to said comparison circuit.

2. In a motor regulating system, a direct current motor, a source of direct supply providing a constant excitation voltage to the field of said motor, a first position responsive means connected to said motor to produce an output indicative of the position of said motor, movable means associated with said motor output and regulated therewith, a second position responsive means connected to said movable means to produce an output indicative of the position of said movable means, adjustable means connected to said first position responsive means to modify its output by an adjustable amount, a differential means connected to the outputs of said position responsive means and the adjustable means to produce an output difference, and electrical means in circuit with said source and responsive to said output difference to vary the excitation voltage applied to the field of said motor in accordance with position differences existing between said motor and said movable means plus said adjustable amount.

3. In a motor regulating system, a direct current motor, a source of direct current supply providing a constant excitation voltage to the field of said motor, a first synchro transmitter coupled to said motor to produce a voltage output representative of the position of said motor, means including a second motor having an output to be regulated, a second synchro transmitter coupled to said means to produce a voltage output representative of the position of said means, said synchro transmitters connected in series circuit opposition whereby their voltage outputs are cancelled when the motor and the means are at synchronized speed and whereby a voltage difference is reflected at their output when a position difference exists, a third synchro transmitter in said series circuit driven at a reduced speed by the second motor for modifying said voltage difference; and means transmitting said modified voltage difference to vary the excitation voltage applied to the field of said motor to substantially return said motor to synchronization with said associated means.

4. In a motor regulating system, a direct current motor to be regulated in accordance with the speed of a process line, a source of direct current supply having its output connected to the input of said motor, a first position responsive means mechanically coupled to said motor and having an output representative of the position of said motor, movable means connected to said process line and indicative of the speed thereof, a second position responsive means coupled to said movable means and having an output representative of the position of said movable means, a third position responsive means connected to said motor comparison means connected to the outputs of said position responsive means to obtain an output difference, and control means associated with said motor connected to the output of said comparison means for varying the position of said motor in a sense to coordinate the position of said motor with the speed of said line.

5. In a motor regulating system, a direct current motor to be regulated in accordance with the speed of a process line, a source of direct current supply having its output connected to the input of said motor, a first synchro transmitter mechanically coupled to said motor and having an electrical output representative of the position of said motor, movable means connected to said process line and indicative of the speed thereof, a second synchro transmitter mechanically coupled to said movable means and having an electrical output representative of the position of said movable means, a third synchro transmitter connected to said motor comparison means connected to the outputs of said synchro transmitters to obtain an electrical output difference, said comparison means including a magnetic amplifier circuit, and control means associated with said motor connected to the output of said comparison means for varying the position of said motor in a sense to coordinate the position of said motor with the speed of said process line.

6. In a motor regulating system, a direct current motor, a source of direct current supply providing a constant excitation voltage to the field of said motor, a first position responsive means connected to said motor to produce an output representative of the position of said motor, movable means associated with said motor output to be regulated therewith, a second position responsive means connected to said movable means to produce an output representative of the position of said movable means, a third position responsive means driven at a reduced speed by the motor, a differential means connected to the outputs of said first and second position responsive means to produce an output difference representative of the output differences between all of said position responsive means, and electrical means in circuit with said source and connected to the output of said differential means to vary the excitation voltage applied to the field of said motor in accordance with position differences occurring between said motor and said movable means.

7. In a motor regulating system; the combination comprising; a pair of D.C. motors each having an exciting field winding and an armature winding; circuit means connecting each of said armatures to a source of regulated voltage, a synchro transmitter for each motor connected to be responsive to the speed of each motor, each of said synchro transmitters having input and output terminals, circuit means connecting the input terminals to a common A.C. source, a third synchro transmitter mechanically connected to be driven at a reduced speed by one of said motors, said third synchro transmitter having input and output terminals, circuit means connecting the input leads of the third synchro transmitter to the output leads of the synchro transmitter connected with said one motor, circuit means connecting the output leads of the third synchro transmitter to the output leads of the synchro transmitter connected to the other motor, and means in said last mentioned circuit means responsive to the relative outputs of said third synchro transmitter and the synchro transmitter connected with the other motor and connected to the field of at least one of said motors for controlling the energization of the field in response to the relative outputs of said synchro transmitters.

8. In a motor regulation system; the combination comprising; a pair of D.C. motors each having an exciting field winding and an armature winding; a position responsive means for each motor connected to be responsive to the position of the motor associated therewith, said means having input terminals connected to a common current source and output terminals connected in a series circuit, a third position responsive means connected with one of the motors and connected in said series circuit, a comparison means connected in said series circuit and responsive to the outputs of the position responsive means and means responsive to said output means for varying the energization of the field of at least one of said motors in response to the outputs of the position responsive means.

References Cited in the file of this patent

UNITED STATES PATENTS

| | | |
|---|---|---|
| 2,451,946 | Harris | Oct. 19, 1948 |
| 2,488,412 | King et al. | Nov. 15, 1949 |
| 2,498,272 | Herchenroeder | Feb. 21, 1950 |

UNITED STATES PATENT OFFICE

CERTIFICATE OF CORRECTION

Patent No. 2,885,616

May 5, 1959

Ernest G. Anger et al.

It is hereby certified that error appears in the printed specification of the above numbered patent requiring correction and that the said Letters Patent should read as corrected below.

Column 2, line 42, for "unitl" read -- until --; column 4, line 46, for "couped" read -- coupled --; column 11, line 9, claim 3, for "difference;" read -- difference, --; line 13, for "associated" read -- first mentioned --; line 25, claim 4, and line 43, claim 5, after "motor", each occurrence, insert a comma; column 12, line 48, claim 8, after "means", first occurrence, insert a comma; lines 48 and 49, for "output" read -- comparison --.

Signed and sealed this 23rd day of February 1960.

(SEAL)
Attest:

KARL H. AXLINE
Attesting Officer

ROBERT C. WATSON
Commissioner of Patents